(12) United States Patent
Anderson et al.

(10) Patent No.: US 6,204,961 B1
(45) Date of Patent: Mar. 20, 2001

(54) DAY AND NIGHT SIGHTING SYSTEM

(75) Inventors: J. Richard Anderson, Altamonte Springs, FL (US); Larry G. Jones, Lawrenceville, GA (US); David Shafer, Fairfield, CT (US); James E. Gibson, Longwood, FL (US)

(73) Assignee: Litton Systems, Inc., Woodland Hills, CA (US)

( * ) Notice: Subject to any disclaimer, the term of this patent is extended or adjusted under 35 U.S.C. 154(b) by 771 days.

(21) Appl. No.: 08/529,330

(22) Filed: Sep. 18, 1995

(51) Int. Cl.[7] ............................ G02B 23/12; G02B 23/06
(52) U.S. Cl. ............................ 359/353; 359/400
(58) Field of Search .................................. 359/353, 351, 359/366, 400, 419, 420, 421

(56) References Cited

U.S. PATENT DOCUMENTS

| | | | |
|---|---|---|---|
| 3,464,757 | 9/1969 | Schmidt et al. | 359/353 |
| 4,260,217 | 4/1981 | Traeger et al. | 359/353 |
| 4,422,758 | 12/1983 | Godfrey et al. | 356/4.02 |
| 5,025,149 | 6/1991 | Hatfield | 356/141.3 |
| 5,084,780 | 1/1992 | Phillips | 359/353 |
| 5,497,266 | 3/1996 | Owen | 359/353 |

FOREIGN PATENT DOCUMENTS 61-132901    6/1986    (JP) ........................................ 359/351

OTHER PUBLICATIONS

R.A. Buchroeder, "Titled–Component Telescopes . . . ", Applied Optics, vol. 9, No. 9, Sep. 1970, pp. 2169–2171 (35/9/366).

*Primary Examiner*—Jon Henry
(74) *Attorney, Agent, or Firm*—William M. Hobby, III (57) ABSTRACT

An integrated day and night sighting system and a laser rangefinder apparatus includes a daylight objective lens having a night light corrector lens mounted adjacent to and coaxially with the daylight objective lens and having an eyepiece lens. An image converter module may be an image intensifier for night light use and is movably supported for movement between a daylight position out of the light path and a night light position in the light path. The image converter is positioned to focus the night light optics thereon and for the eyepiece lens to view the image intensifier screen. A night primary objective mirror is positioned to reflect light from the night objective lens and a night secondary mirror is positioned to receive light from the primary objective mirror and to focus the night light onto the image converter when the image converter is in the night light position. This allows a refractive day sight to be integrated with a reflective night sight. The night light corrector lens are tilted in the rangefinder to compensate for beamsplitter astigmatism to give diffraction limited on-axis performance. The sighting system is incorporated into a laser rangefinder having a laser for transmitting a laser beam and a receiver for receiving the reflected laser beam.

24 Claims, 8 Drawing Sheets

DAY AND NIGHT SIGHTING SYSTEM

BACKGROUND OF THE INVENTION

The present application relates to an integrated day and night sighting system and to a laser rangefinder having the integrated day and night sighting system. This invention addresses the need for minimum size and weight in handheld laser rangefinders used by military ground forces in nighttime as well as daytime conditions. Integrated optics are needed to provide the following functions: a telescopic day vision sight; telescopic night vision sight; sighting reference (e.g., crosshair reticle) for both day and night operations; laser beam divergence reduction; and target return signal collection and focusing onto a laser ranging receiver.

Telescopic day vision is usually achieved with direct view optics such as used in conventional telescopes and binoculars. These optics operate in the human visual light spectrum of 0.4 to 0.7 um wavelength. In their simplest form they comprise an objective lens that focuses the scene image onto the focal plane of an eyepiece. The ratio of objective focal length to eyepiece focal length establishes the magnification. To present a non-inverted image to the user, an imaging erection prism is added between the objective lens and the focal plane.

Telescopic night vision is achieved with an image converter, which can be an image intensifier or a thermal imaging module. Objective optics collect the scene light and focus it onto the image converter. The input aperture of these optics needs to be as large as possible (small f-number) to maximize image intensity at the image converter. The image intensifier is a single component in which a weak (moonlit, starlit) scene image focused on the input photocathode produces electrons that are amplified and directed to a phosphor coating on the output surface where they produce an amplified image for viewing with an eyepiece. This operates in the 0.7–1.1 um wavelength region. The simplest thermal imaging module comprises an uncooled, staring (non-scanned) detector array whose output is presented to a flat panel display that is viewed with an eyepiece. This operates in the 8 to 14 um wavelength region. Other implementations of a thermal imaging module can operate in the 3 to 5 um wavelength region, employ thermoelectric or Stirling cooled detectors, and/or use a cathode ray tube (CRT) as the display.

To aim a laser rangefinder requires a sighting reference, such as a crosshairs reticle, that boresights the day and night vision optics to the laser beam. The reticle can take a number of forms. A day sight can use a passive reticle plate residing in the common focal planes of the objective and eyepiece. An image intensified sight can produce the reticle with a light emitting diode (LED) array and project it into the eyepiece using a beamsplitter to combine the image intensifier image and the reticle. A thermal imaging sight can produce the reticle on the flat panel or CRT display. The two latter forms of the reticle also allow alphanumeric data and/or indicators to be displayed without additional elements.

The output beam divergence of a laser transmitter (resonator) is not usually narrow enough to produce a small spot on a distant target such as a vehicle so that an afocal beam collimation telescope is necessary. This comprises a negative power input lens and a positive power output lens. The resulting output beam diameter is enlarged and the beam divergence is reduced. To avoid possible eye damage to a person accidentally exposed to the beam, the laser wavelength is commonly in the 1.5 um region, for which the eye has poor transmission.

The laser receiver requires optics to collect return signal power from the target and focus it onto the receiver's detector. Maximum input aperture results in maximum range capability. The receiver incorporates an optical filter to minimize sunlight detection and thereby maximize receiver sensitivity.

The above functions can be achieved with separate apertures and corresponding optical arrangements. However, striving for a single aperture and using optical elements for more than one function minimizes the size of the optics. That is the aim of this invention. The invention is applicable not only to a handheld laser rangefinder but to any rangefinder and to any day and night sighting system.

The Phillips U.S. Pat. No. 5,084,780, for a telescopic sight for day/night viewing illustrates a scope adaptable for use on weapons and includes a single objective lens with two parallel light paths, one for day viewing and one for night viewing. Separating mirrors transmit light from the objective along the night path and reflects light from the objective lens to the day path. The night path includes an image intensifier assembly. A mirror at the end of the night path reflects the light from the image intensifier assembly to a beam splitter on the day path. The beam splitter transmits the light from the day path and reflects the light from the night path along the same path to an ocular assembly for viewing. A second embodiment is similar except that it contains two objective lens assemblies for collecting the light, one for the night path and one for the day path. Since this embodiment has two separate objective lens assemblies, separating mirrors are not included. A third embodiment includes a projected aiming reticle in a direct view for day viewing, which replaces one of the objective lens assemblies. This prior patent combines the daytime and nighttime optics in a telescopic sight by separating the optics into two separate paths between the objective lens and the eyepiece assembly. In contrast, the present invention uses a coaxially mounted lens with a night light mirror objective lens in the same optic path for the day and night light.

SUMMARY OF THE INVENTION

An integrated day and night sighting system and laser rangefinder apparatus has a refractive day sight having an objective lens, an image erecting prism, and an eyepiece and a night sight having a reflective objective, an image converter module, and the same eyepiece as the day sight. The objective includes primary and secondary mirrors (e.g., a Cassegrain design) that are coaxial with the day sight. This objective has an aperture larger than the day sight, and the day sight objective lens blocks the central portion of the night sight aperture. A lens introduced in the day sight has one surface coated for transmission of visual wavelengths and reflection of infrared wavelengths and acts as the secondary mirror for the night sight objective. The image converter module can be an image intensifier or a thermal imaging module. The input surface of the image converter is placed at the focal plane of the night sight objective, and the output surface is placed at the same location as the focal plane of the day sight. This allows the same eyepiece to be used for both day and night sights. The image converter module can be rotated or translated out of view for day sighting and into view for night sighting.

If the lens surface that acts as the secondary mirror for the night sight is coated to reflect essentially all wavelengths longer than the visual spectrum, then it will block wavelengths coming through the day channel that would cause night image washout (loss of contrast). Similarly, there would be no washout in the day sight due to unfocused visual wavelengths coming through the night channel. However, for maximum night sight sensitivity, it is desirable to achieve a spectral crossover region of the image intensifier and visual spectra that lies in the red region of the latter. In that case, selection of one or more materials and coatings in the day sight channel can provide the additional wavelength blocking to prevent night image washout, and a coating on the display beamsplitter cube can block the residual visual red coming from the night channel and interfering with the day image.

A sighting reference and data display includes an active source, such as an LED array, and a beamsplitter. The reticle is placed at the beamsplitter-reflected focal plane of the eyepiece. Thus, the day or night sight scene image, reticle, and data display are superimposed when viewed through the eyepiece. Night sight boresight is achieved by positioning the reticle so that it centers on the image of the laser beam spot at a target (as determined by direct viewing with the image converter module or by use of benchtop focusing optics that produce a burn spot visible in the sight). Day sight boresight is achieved by using Risley prisms in the day sight optics to allow the image of the laser spot to be centered on the reticle. The image converter module position in the focal plane is not critical to boresight because the output image is always in the same relationship to the input image.

A laser beam collimation telescope has the same objective lens as the day sight, a beamsplitter, and an input negative lens. The beamsplitter is coated for transmission of visual wavelengths and reflection of the laser wavelength. Additional optics useful for aligning the output beam of the laser transmitter with the telescope axis are: Risley prisms for angular alignment and a steering block for translational alignment.

The laser receiver optics has the same reflective objective as the night sight, a beamsplitter, and a lens to set the desired focal length and allow the receiver to be positioned outside of the optical area. The beamsplitter is coated for transmission of visual and IR wavelengths and reflection of the laser wavelength.

Corrective optics for the night sight has two tilted lenses with central openings to avoid interference with the day sight and laser telescope. These lenses allow use of a simple spherical surface on the primary mirror, and tilting these lenses corrects the astigmatism induced in the night sight image by the laser receiver beamsplitter. The astigmatism is not a problem for the relatively high f-number permitted for the day sight, but becomes a problem for the low f-numbers desired for night sight performance.

BRIEF DESCRIPTION OF THE DRAWINGS

Other objects, features, and advantages of the present invention will be apparent from the written description and the drawings in which.

DETAILED DESCRIPTION OF THE PREFERRED EMBODIMENT

Figure 1:
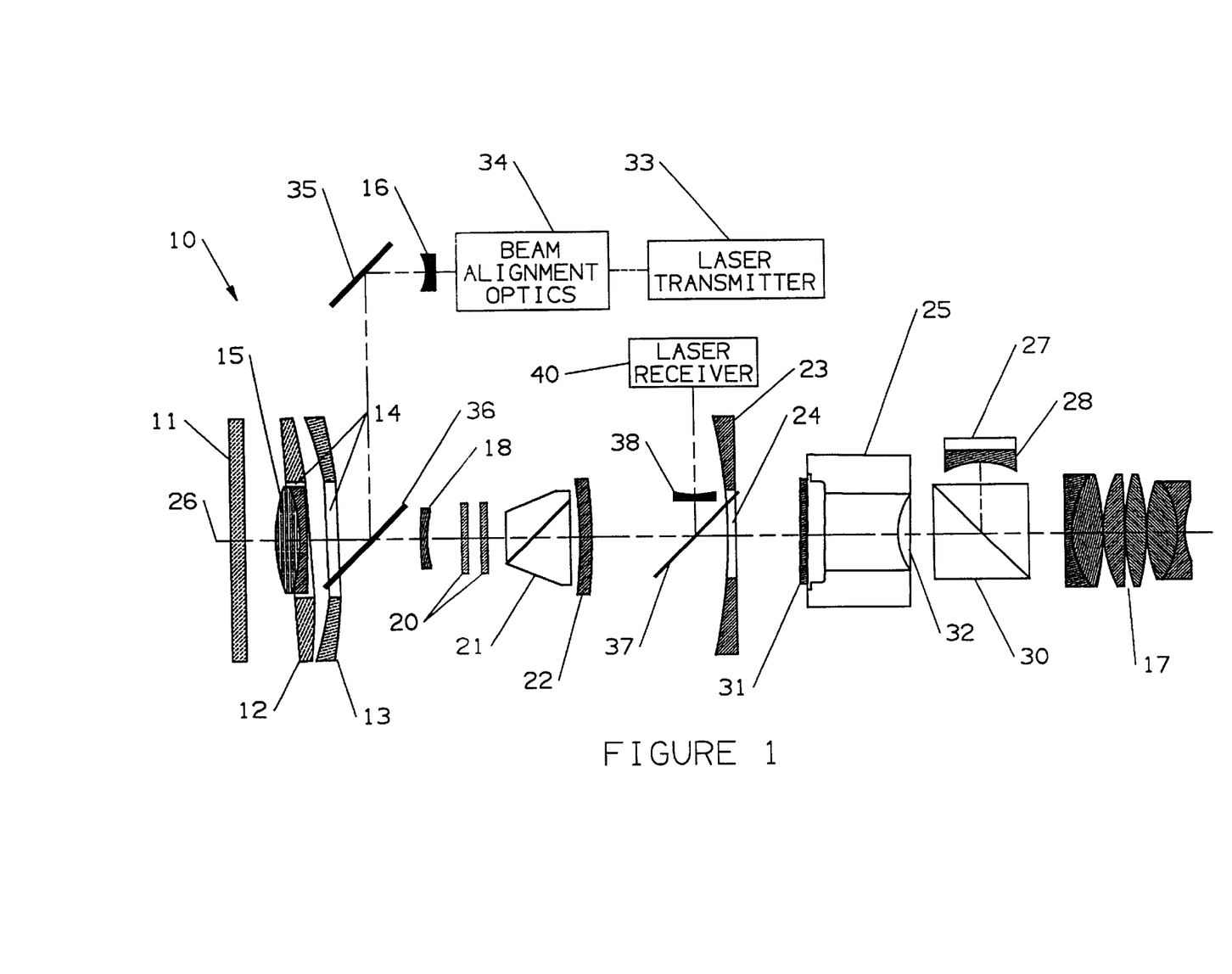
FIG. 1 is a sighting system and laser rangefinder optical schematic in accordance with the present invention.

Referring to the drawings, FIG. 1, an integrated day and night sight laser rangefinder 10 illustrates the basic implementation of the rangefinder which includes a coaxial day and night sight configuration and includes a window 11 for sealing the optics within a housing. A pair of night sight corrector lenses 12 and 13 have an opening 14 through their center to provide for the day objective lens 15. The day objective lens 15 also serves as the positive objective lens for the laser transmitter telescope for which lens 16 is the negative input lens. An eyepiece lens assembly 17 is mounted at the outer end of the daylight optical path, which optical path includes a daylight negative lens 18 to set focal length, followed by a pair of day Risley prisms 20, a Schmidt/Pechan image erecting prism 21, and lens 22 whose primary purpose is to provide a surface that acts as the night secondary mirror. The night primary mirror 23 has an aperture 24 therethrough. An image intensifier 25 is shown in the light path behind the night primary mirror and is adapted to be swung out of the light path behind the opening 24 and the night primary mirror 23. That is, the image intensifier 25 can be put into the path along the sighting system central axis 26 or removed from the path, which is done by the operator through manual or electrically actuated means. The reticle display 27 is produced by an LED and a lens 28 provides correction as required. Beam splitter 30 directs the reticle display into the eyepiece lens 17. The image intensifier 25 includes a photocathode surface 31 and a phosphor screen 32 which produces the intensified image.

The laser rangefinder portion of the system includes the laser transmitter 33 which directs a laser beam through the laser beam alignment optics 34 and laser telescope negative lens 16 against a mirror 35 and onto a beam splitter 36 which directs the beam through the laser telescope daylight objective lens 15 and to a target sighted through the sighting system. The reflected light from the laser beam then returns through the night light optics and has a portion deflected by the receiver beam splitter 37 through a receiver lens 38 that sets focal length and onto a surface of a detector in the receiver 40, which detects the return beam for determining the range of an object which has been aimed with the rangefinder.

Figure 2:
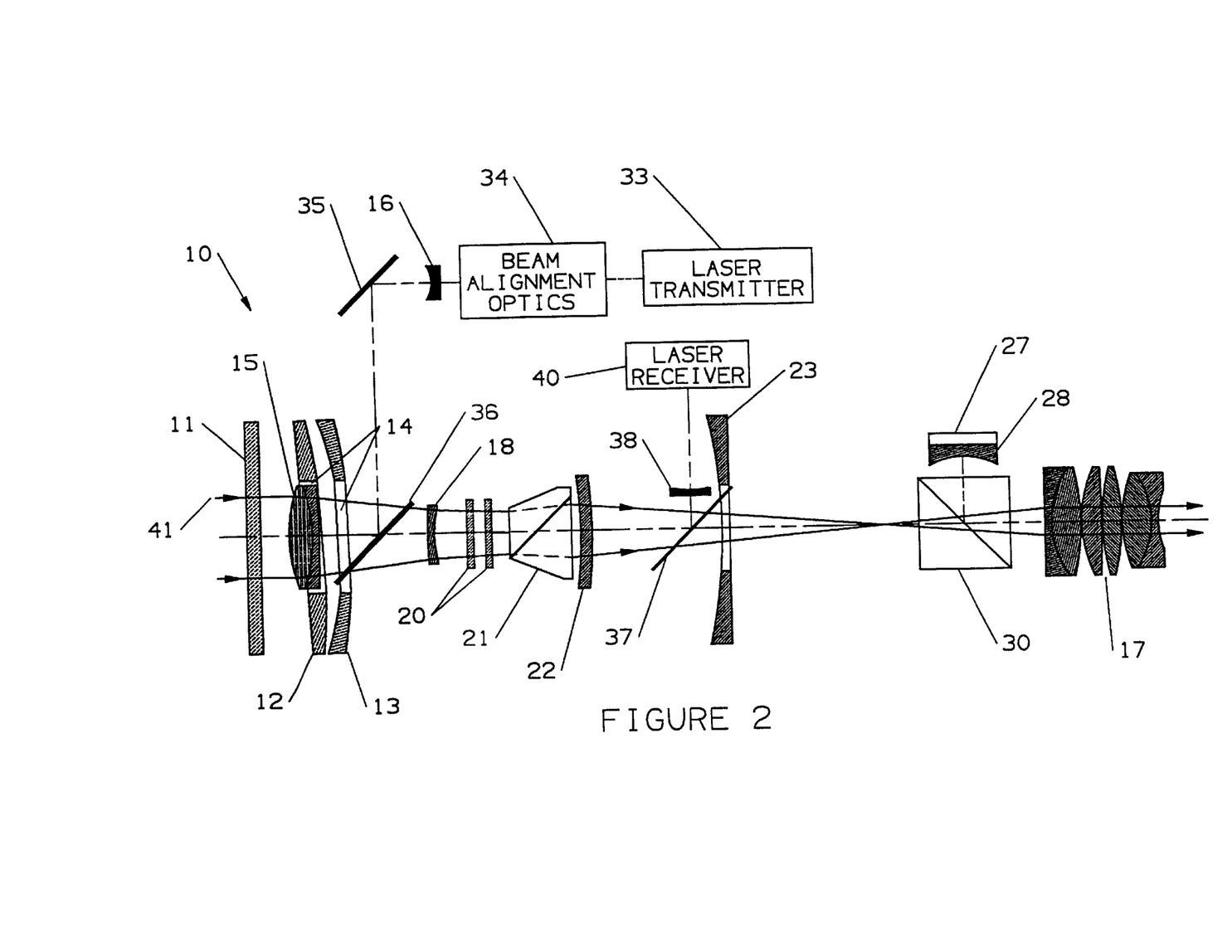
FIG. 2 is the optical schematic of FIG. 1 having the daylight light path.

The integrated day/night sight and laser rangefinder in accordance with FIG. 1 provides for a coaxial day and night sight configuration in which the day sight uses refractive optics for a light path following the central axis 26 from the objective lens 15 to the eyepiece lens 17, as illustrated in FIG. 2. The light path 41 passes through the window 11 and through the daylight objective lens 15 where it is refracted through the aperture 14 of the lens 13 and passes through the beam splitter 36 and through the daylight negative lens and day risleys 20 and through the Schmidt/Pechan prism 21 whereupon the light path passes through the night secondary mirror 22 and through the night primary mirror 23 central opening 24.

As seen in FIG. 2, the image intensifier 25 of FIG. 1 has been moved out of the daylight light path along the axis 26 so that the daylight light path 41 passes directly through the beam splitter 30 and through the eyepiece lens 17. Thus, during daylight hours, visible light is used for sighting a target for the rangefinder. A user can sight and align the rangefinder for determining the range to an object at which time the output from the laser 33 through the laser output optics 34 and negative lens 16 is directed by the mirror 35 against the beam splitter 36 and out the daylight objective lens 15, which is also the laser output lens. The laser beam is directed towards the target and the return signal is reflected by the receiver beam splitter 37 and directed against the receiver 40.

Figure 3:
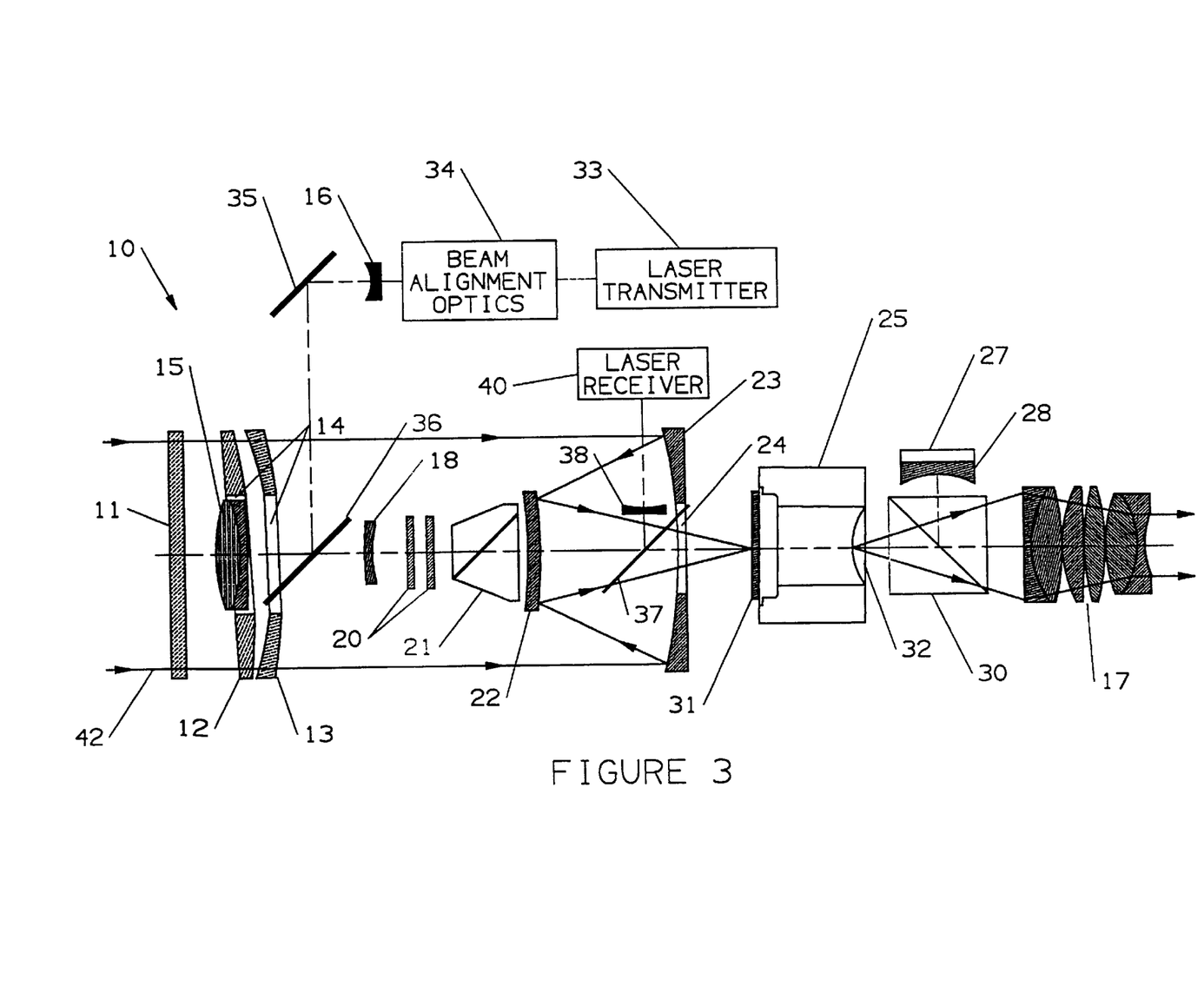
FIG. 3 is the optical schematic of FIG. 1 having the night light path.

Turning to FIG. 3, the optical schematic of FIGS. 1 and 2 is illustrated having the night sight light path 42 illustrated. The night light wavelengths of interest are those in the infrared suitable for use with an image intensifier 32 or an alternative thermal imager. The image intensifier is sensitive to wavelengths in the far red to near infrared portion of the spectrum. The night light or infrared energy passing through the night light path 42 passes the window 11, which is transparent to both visible and infrared light, and through the night objective corrector lenses 12 and 13 centered around the daylight objective lens 15 where the infrared energy is directed against the night primary mirror 23. The primary mirror 23 reflects the infrared light onto lens 22 which acts as the night secondary mirror. The lens 22 is coated to transmit visual wavelengths and to reflect infrared wavelengths. If the night sight uses an image intensifier, the coating reflects far red to near infrared. If the night sight uses a thermal imager, the coating reflects either mid IR in the 3–5 $\mu$m band or the long IR in the 8–14 $\mu$m band. The night light is reflected by the night secondary mirror 22 through the opening 24 in the night primary mirror 23 and onto the receptor surface 31 of the image intensifier or thermal imager 25 where the image is displayed as visible light on the screen 32. The image on screen 32 is seen by the user through the eyepiece lens 17. It will, of course, be clear that the rangefinder portion of the system transmits a laser beam and receives a reflected beam so that it operates day or night in accordance with the laser wavelength. The sighting system is for the benefit of the user being able to sight the rangefinder on a target.

The coaxial design, as illustrated in FIGS. 1–3, takes advantage of the two different focal planes for the day and night sight and swings the image intensifier 25 onto the common optical axis 26 when employing the night sight. This allows the use of the same eyepiece for both day and night sight. Night sight optics require a faster design than the day sight so the night sight focal plane can occur at the input plane of the intensifier. The output plane 32 of the intensifier in the day sight focal plane can be coplanar with the daysight image plane as required for use of a common eyepiece lens 17. The night sight boresight is insensitive to an intensifier cross-axis position so the swinging of the image intensifier into and out of alignment with the light does not have to be achieved with a high degree of tolerance. It should also be realized that the image intensifier 25 can also be a thermal night sight module which is merely substituted for the image intensifier. One implementation of this is with an uncooled focal plane detector array and a small flat panel display, such as an LCD display, and the required electronics for the thermal night sight module can be integrated or can be a separate package.

Figure 4:
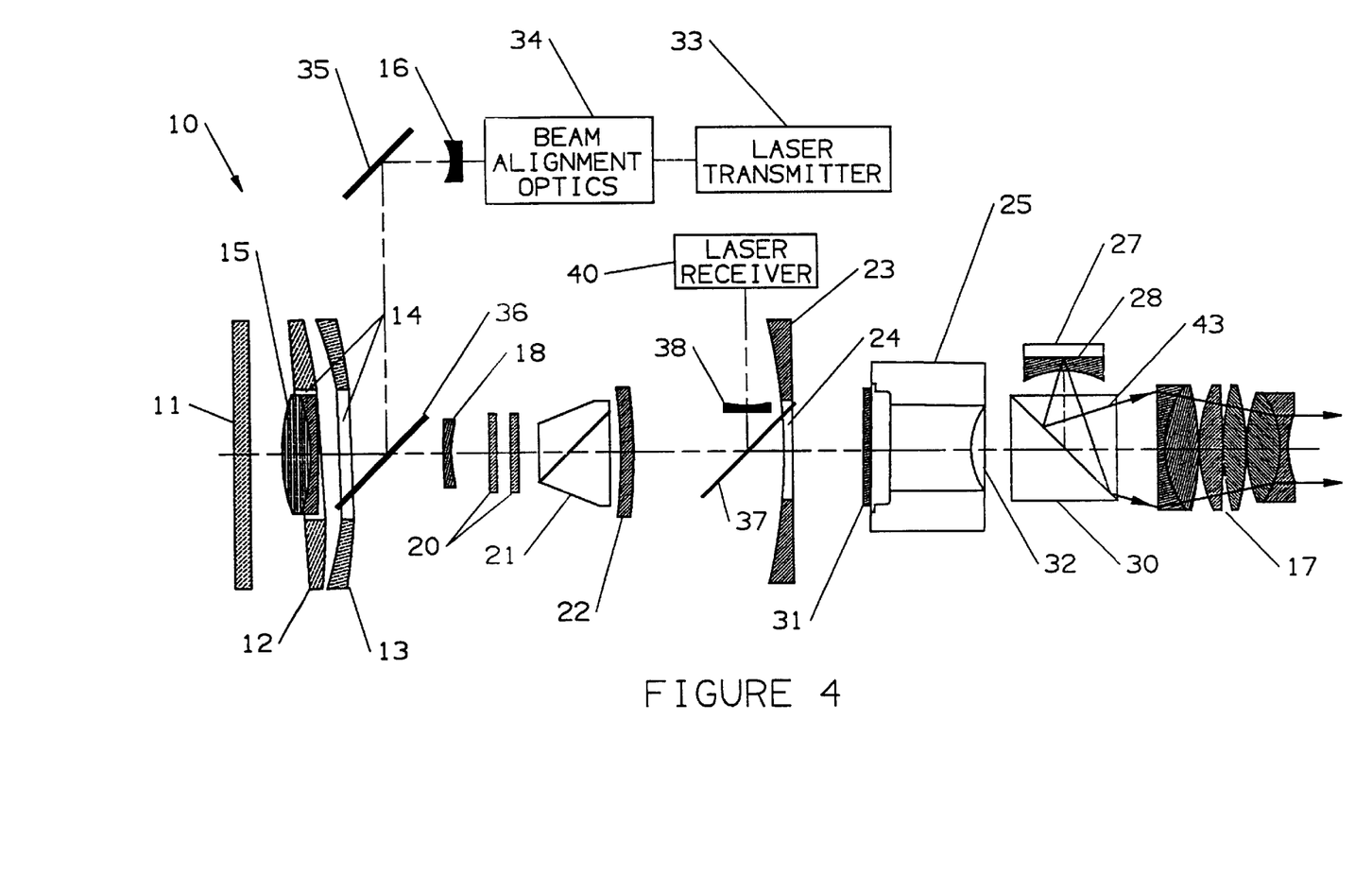
FIG. 4 is the optical schematic of FIG. 1 having the reticle/display path.

Turning to FIG. 4, the optical schematic of FIG. 1 is illustrated with the LED reticle and display ray path. The reticle/display light 43, produced by the reticle/display LED array 27, passes through the lens 28, which provides necessary optical correction, and is reflected by the beam splitter 30 into the eyepiece lens 17. This allows the aiming point and display to be viewed with either the daylight or night light sighting system. The LED reticle is, of course, used to align the rangefinder with the target being sighted.

Figure 5:
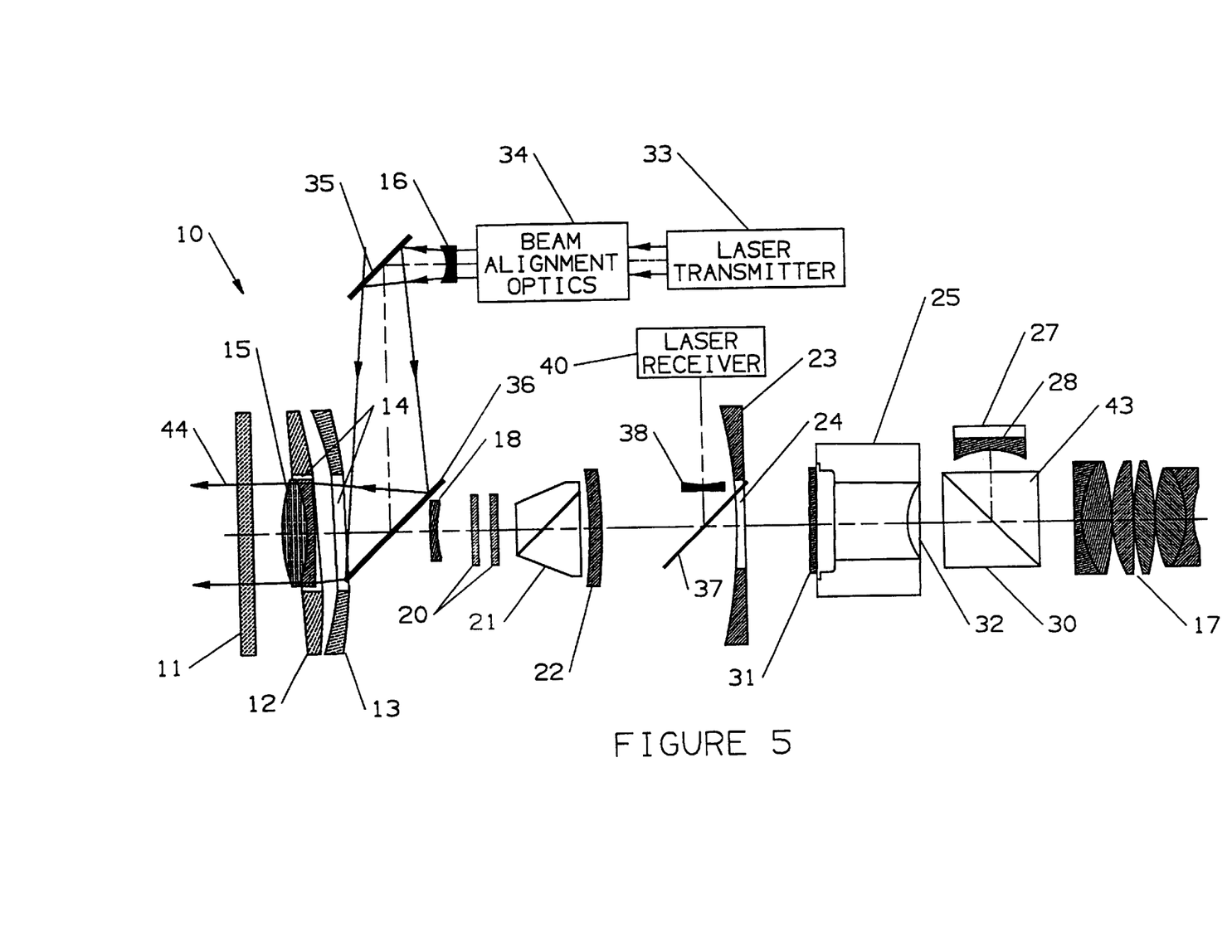
FIG. 5 is the optical schematic of FIG. 1 having the laser rangefinder transmitter light path.

In FIG. 5, the laser transmitter ray path 44 is illustrated in the optical schematic of FIG. 1. The laser beam can be seen passing through the laser output optics 34, which serve to align the beam with the output telescope created by lenses 15 and 16. The beam is deflected by the mirror 35 onto the beam splitter 36 and through the opening 14 of the lens 13 and then through the day objective and laser positive output lens 15.

Figure 6:
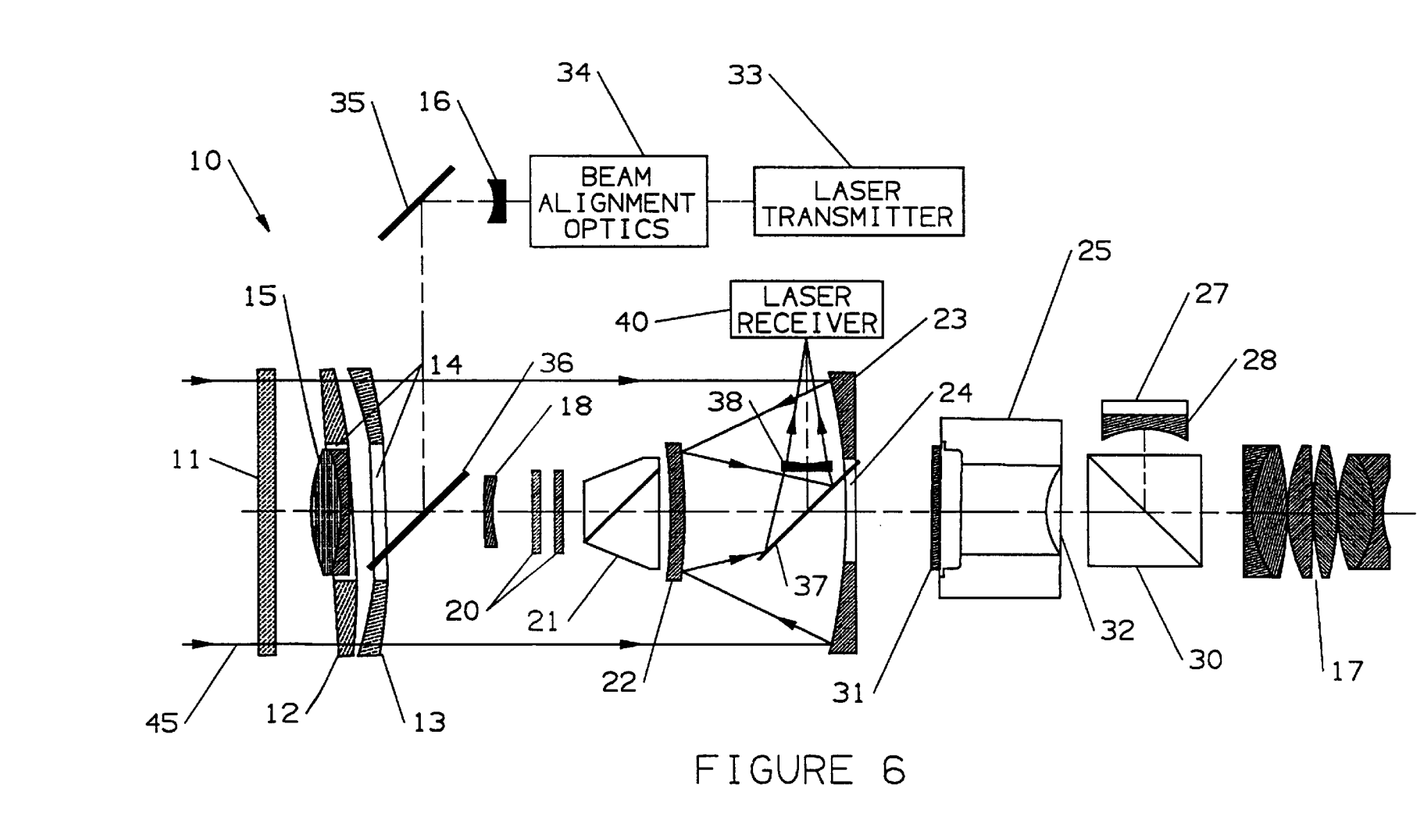
FIG. 6 is the optical schematic of FIG. 1 having the laser rangefinder receiver light path.

The infrared light 45 returned from the target is illustrated in FIG. 6. The light path 45 passes through the window 11 and through the night objective corrector lenses 12 and 13. These rays are reflected by the primary night mirror 23 onto the night secondary mirror 22 which reflects the infrared energy onto the receiver beam splitter 37 which in turn reflects the rays through the receiver lens 38 and into the receiver 40.

Figure 7:
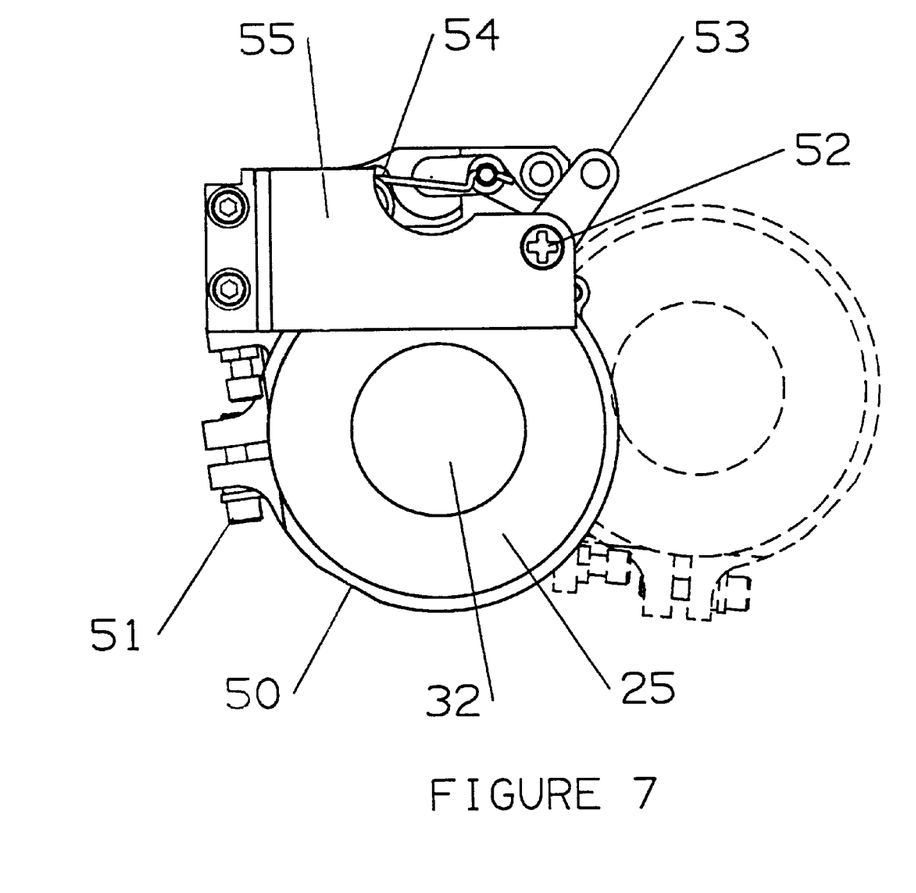
FIG. 7 is an elevation of the swing latching mechanism for the image intensifier.

FIG. 7 is an elevation of the swing latching mechanism for the image intensifier 25 which has the viewing screen 32. The image intensifier is mounted in a clamp 50 having a clamping bolt 51 and rotates on an pin 52. A manual lever 53 interfaces with an arm for shifting the image intensifier 25 from the position shown to a position shown in phantom out of the optical axis when the sight is being used for daytime sighting. A spring latching mechanism 54 is also attached to the frame 55 and holds the clamp 50 and the image intensifier 25 in the operative position for nighttime viewing or in the daytime viewing position swung out of the central axis.

Figure 8:
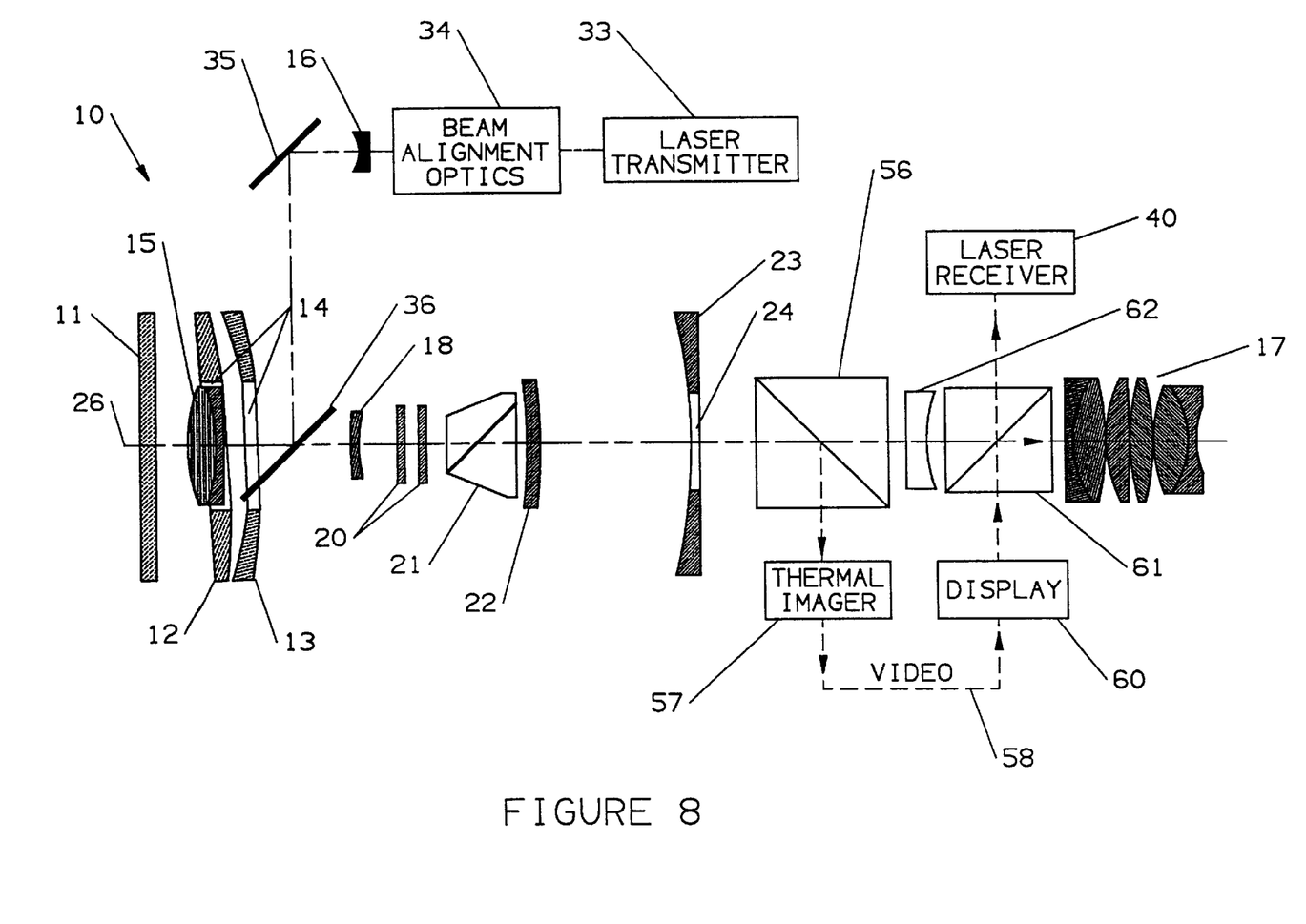
FIG. 8 is an optical schematic of an alternative embodiment of a sighting system having a thermal imager.

FIG. 8 shows an alternate embodiment of an integrated day and night light laser rangefinder 10 having a window 11 and a pair of night sight corrector lens 12 and 13 having an opening 14 therethrough providing for the day objective lens 15. The sighting system central axis 26 also has the beam splitter 36 and the day light negative lens 18 and day Risley prisms 20 and the image erecting prism 21 mounted along the axis 26. The night primary mirror 23 has the opening 24 and reflects the night light onto the lens 22, as in the previous embodiment. The night light is transmitted through the opening 24 and onto the beam splitter 56, which replaces the image intensifier and directs the night light against a thermal imager 57 which produces a video signal through the line 58 into the display 60. The display 60 produces the night image onto a beam splitter 61 which directs the image into the eyepiece assembly 17. The beam splitter 61 also passes the received laser light into the laser receiver 40. The day light path passes the light through the beam splitter 56 and through the day sight reticle 62 and through the beam splitter 61 onto the eyepiece assembly 17. The laser transmitter 33 directs a laser beam onto the beam aligning optics 34 and then through the lens 16 and onto the mirror 35 which directs the beam against the beam splitter 36 and out the objective optics along the central axis 26. As can be seen, this embodiment replaces the image intensifier with a thermal imager and eliminates the swing mechanism while utilizing the beam splitter 61 to direct the night light display into the eyepiece assembly and simultaneously direct the received laser energy into the laser receiver 40. The day light path follows the central viewing axis 26 as in the prior embodiment.

It should be clear at this time that the daylight objective lens 15 does double duty as the objective of the laser transmitter beam collimation telescope and that the night sight objective does double duty as the laser receiver objective. Except for FIG. 8, the beam splitter for the receiver tends to produce excessive astigmatism in the fast night sight optics. However, the refractive elements at the night sight aperture lens 12 and 13 not only allow for a simple spherical surface on the primary mirror but also tilt to eliminate the astigmatism, as illustrated in FIG. 3. Tilting one lens compensates for beamsplitter astigmatism but puts an on-axis coma into the system. Tilting the other lens corrects for the coma and gives diffraction limited on-axis performance. The optimum focal plane at this time has been found to be about one degree to the on-axis input direction.

An integrated day and night sight and laser rangefinder has been provided which provides for a very compact design in which the user can quickly sight at night or in low light level with a night sight system or can readily use the same sight for a day sighting system by the moving of the image intensifier into and out of the common light path. However, it should also be clear that the present invention is not to be considered as limited to the forms shown which are to be considered illustrative rather than restrictive.

We claim:

1. An integrated day and night sighting system comprising:
   a daylight optical system having daylight optics for collecting and focusing visible light from an objective lens onto an eyepiece lens assembly in a daylight light path between said objective lens and said eyepiece lens assembly;
   a night light corrector lens mounted adjacent said daylight objective lens, said night correction lens including a pair of tilted lens elements to compensate for astigmatism;
   an image converter for night light use and being movably supported for movement into and out of the daylight light oath between a daylight position out of the light path and a night light position in the light path, said image converter being positioned for said eyepiece lens assembly to focus thereon when said image converter is in said light path;
   a night reticle display positioned between said image converter and said eyepiece lens assembly;
   a night light primary mirror positioned to reflect light from said night light corrector lens; and
   a night light secondary mirror positioned to receive light from said night primary objective mirror and to focus the light onto said image converter when said image converter is in a night light position, whereby an integrated night and day light optical system is provided in a compact packaging.

2. An integrated day and night sighting system in accordance with claim 1 in which said night light secondary mirror is positioned in said light path and is coated to pass visible light therethrough and to reflect infrared light.

3. An integrated day and night Fighting system in accordance with claim 2 in which said image converter is an image intensifier.

4. An integrated day and night sighting system in accordance with claim 1 in which said day objective lens and said night light corrector lenses are mounted together with said night light corrector lens mounted coaxial of said day objective lens.

5. An integrated day and night sighting system in accordance with claim 3 in which said night secondary mirror has a curvature for focusing the infrared light onto an image plane between the primary objective mirror and the daylight objective focal plane so that the image plane coincides with the input surface of said image intensifier when the image intensifier is in the night light position.

6. An integrated day and night sighting system in accordance with claim 5 including a risley lens mounted in said optical path between said daylight objective and said eyepiece lens.

7. An integrated day and night sighting system in accordance with claim 6 including a daylight negative lens mounted in said optical path between said daylight objective lens and said eyepiece lens assembly.

8. An integrated day and night sighting system in accordance with claim 7 in which said night reticle display includes a beamsplitter positioned in front of said eyepiece lens assembly for directing said reticle display onto said eyepiece lens assembly.

9. An integrated day and night sighting system in accordance with claim 1 including:
   a laser positioned for directing a laser beam through said daylight objective lens; and
   a rangefinder receiver for receiving reflected laser light received by said sighting system, whereby a laser rangefinder is formed in a compact design with a day and night light sight.

10. A laser rangefinder system in accordance with claim 9 including a laser beamsplitter for directing said laser beam through said daylight objective lens.

11. A laser rangefinder system in accordance with claim 10 including a receiver beamsplitter for directing light being received by said integrated day and night sighting system onto a rangefinder receiver.

12. An integrated day and night sighting system in accordance with claim 1 in which said night light corrector lens is a pair of tilted lens elements.

13. An integrated day and night sighting system in accordance with claim 12 in which said day objective lens has a pair of larger night corrector lenses mounted coaxially thereto whereby the day objective lens directs light through an opening in said night corrector lens.

14. An integrated day and night rangefinder system comprising:
   a daylight objective lens;
   a night corrector lens coaxially mounted to said daylight objective lens;
   an eyepiece lens assembly;
   an image converter for night light use and being mounted to receive infrared light thereon, said image intensifier being positioned for said eyepiece lens assembly to focus thereon;
   a laser;
   a laser beamsplitter for receiving a laser beam from said laser thereon and directing said beam through said day objective lens;
   a night objective mirror positioned to reflect night light from said night corrector lens;
   a night secondary mirror positioned to receive light from said night objectives mirror and to focus the night light onto said image intensifier; and
   a receiver beamsplitter positioned in said light path, said receiver beamsplitter directing received light to a rangefinder receiver, whereby an integrated rangefinder system is provided in a compact design with a night and day light sight.

15. An integrated day and night rangefinder system in accordance with claim 14 in which said night corrector lens is tilted to compensate for astigmatism.

16. An integrated day and night rangefinder system in accordance with claim 15 in which said night objective lens includes a pair of tilted lens elements.

17. An integrated day and night rangefinder system in accordance with claim 14 in which a night secondary mirror is positioned in said light path to pass visible light and to reflect infrared light.

18. An integrated day and night rangefinder system in accordance with claim 17 in which said image converter is an image intensifier.

19. An integrated day and night rangefinder system in accordance with claim 14 including a reticle display.

20. An integrated day and night rangefinder system in accordance with claim 19 in which said receiver beamsplitter is positioned for directing the image of said reticle display onto said eyepiece assembly.

21. An integrated day and night rangefinder system in accordance with claim 14 including visible light optics located between said day objective lens and said eyepiece lens assembly for focusing daylight onto said eyepiece lens assembly.

22. An integrated day and night rangefinder system in accordance with claim 21 including a day light image erecting prism.

23. An integrated day and night rangefinder system in accordance with claim 19 including a beamsplitter positioned between said image intensifier and said eyepiece lens assembly for directing said reticle display into said eyepiece lens assembly.

24. An integrated day and night sighting system in accordance with claim 14 in which said night corrector lens is coaxially mounted to said day objective lens whereby the day objective lens directs light through an opening in said night corrector lens and said night corrector lens directs infrared light received around said day objective lens.

* * * * *